(12) United States Patent
Toda et al.

(10) Patent No.: US 7,664,964 B2
(45) Date of Patent: Feb. 16, 2010

(54) ELECTRONIC MEDIA COMMUNICATION APPARATUS

(75) Inventors: Kenji Toda, Tsukuba (JP); Hiroyuki Yokoyama, Fujimino (JP)

(73) Assignees: National Institute of Advanced Industrial Science and Technology, Tokyo (JP); KDDI Corporation, Tokyo (JP)

( * ) Notice: Subject to any disclaimer, the term of this patent is extended or adjusted under 35 U.S.C. 154(b) by 661 days.

(21) Appl. No.: 11/328,229

(22) Filed: Jan. 10, 2006

(65) Prior Publication Data

US 2006/0191019 A1 Aug. 24, 2006

(30) Foreign Application Priority Data

Jan. 11, 2005 (JP) ............................. 2005-003959

(51) Int. Cl.
*H04L 9/32* (2006.01)
*H04N 7/167* (2006.01)

(52) U.S. Cl. ........................ 713/189; 713/193; 380/200; 380/201

(58) Field of Classification Search ......... 713/189–194, 713/174; 380/200–203; 726/26–27, 30
See application file for complete search history.

(56) References Cited

U.S. PATENT DOCUMENTS 5,392,351 A * 2/1995 Hasebe et al. ................. 705/51

FOREIGN PATENT DOCUMENTS

JP 2003-69551 3/2003

* cited by examiner

*Primary Examiner*—Hosuk Song
(74) *Attorney, Agent, or Firm*—Oblon, Spivak, McClelland, Maier & Neustadt, L.L.P.

(57) ABSTRACT

An electronic media communication apparatus is provided in which encryption keys and decryption algorithms are provided as circuits concealed in logic programmable devices. When the client requests delivery of electronic media, the server individually encrypts the electronic media and delivers the encrypted electronic media to the client. In the client, an electronic media specific circuit section uses logic circuit data received via a client data communication section to generate an electronic media specific logic circuit. Then, a logic circuit configuration section combines the logic circuit with a terminal specific circuit section uniquely implemented for the client to form an electronic media security circuit section. The original digital content can then be generated by inputting the encrypted electronic media stored in a storage unit to the electronic media security circuit section. Correct decryption is only possible when the electronic media specific circuit section and the terminal specific circuit section are used together in combination.

4 Claims, 9 Drawing Sheets

ELECTRONIC MEDIA COMMUNICATION APPARATUS

BACKGROUND OF THE INVENTION

1. Field of the Invention

The present invention relates to an apparatus that securely distributes encrypted digital contents (hereinafter also referred to as "electronic media") from a server to a client over a network, and also provides a mechanism that prevents unauthorized use of digital contents. The apparatus can thereby be regarded as having a part of the Digital Rights Management (DRM) function.

2. Description of the Prior Art

When electronic media are being distributed over a network, methods of preventing the media being copied include channel encoding in which the distribution channel from the server to the client is encrypted to prevent it being tapped by a third party, and content encrypting in which the content is encrypted to prevent unauthorized use. There are various algorithms for performing the encryption, such as DES, Triple DES, AES, MULTI, RC5, and MISTY. Decryption by exchanging a key is performed by the use of a key on the basis of the RSA public-key cryptosystem or other such methods.

With the above methods, however, there is a risk that some means may be used to crack a client's application software or operating system, or that when bit-strings flowing through a data bus are measured by a measurement device, the decryption key, or the raw data produced by decrypting the electronic media, may be stolen.

With the object of recording data that makes it difficult for an unauthorized user to acquire an encryption key, Unexamined Patent Application Publication 2003-69551 discloses an encryption apparatus, and method that records first encryption data and a first encryption key encrypted using a second encryption key on an information storage medium, holds the second encryption key encrypted using a third encryption key and holds the third encryption key.

Thus, the above disclosure is somewhat effective in preventing unauthorized copying by using a plurality of encryptions to protect the entire storage medium. However, the above-mentioned constitution requires considerable processing to encrypt and decrypt the electronic media. Carrying out the processing requires the use of devices that are capable of high-speed processing, which makes it costly. Moreover, because of the encryption keys that are used as the encryption means being generated by a program put in a storage medium, the above-mentioned apparatus and method merely make it more complicated to obtain encryption keys and, in addition, do not adequately prevent unauthorized copying of the electronic media, and as such, do not provide sufficient security for the information concerned.

In view of the shortcomings of the prior art described above, the object of the present invention is to provide an electronic media communication apparatus which is equipped with means for keeping an encryption key secret in a logic programmable device as a circuit and in which the decryption algorithm is also built-in as a circuit in the logic programmable device to thereby enable hardware-based decryption.

SUMMARY OF THE INVENTION

To achieve the above object, the present invention provides an electronic media communication apparatus that distributes encrypted electronic media from a server to a client over a network, wherein the server comprises encryption means that performs encryption of electronic media distributed to the client, using an encryption system according to the mechanisms in the client, electronic media specific circuit configuration means that generates logic circuit data for decrypting the encrypted electronic media and removes from the generated logic circuit data circuit data specific to the terminal uniquely implemented for the client to generate logic circuit data specific to the electronic media, and means for transmitting to the client the encrypted electronic media and the logic circuit data generated by the electronic media specific circuit configuration means; and the client comprises means for constructing an electronic media security circuit by receiving the logic circuit data generated by the electronic media specific circuit configuration means, generating a logic circuit specific to the electronic media and combining the logic circuit and the terminal specific circuit uniquely implemented for the client, and information output means that uses the electronic media security circuit to decrypt the encrypted electronic media and converts it to usable electronic media for output.

In accordance with this invention, keys required for decryption are generated inside a logic programmable device, and the software mode used to operate the decryption algorithm does not expose the decryption algorithm. Also, even if there is unauthorized access to the contents of the electronic media specific circuit resulting in the decoding thereof, that alone is not enough to effect operation.

Accordingly, the electronic media communication apparatus of this invention makes it extremely difficult for a third party who does not know the terminal specific circuit to synthesize it, making unauthorized use of the electronic media much more difficult. Moreover, incorporating the MPEG expansion circuit and the video output circuit and the like into content specific circuits ensures that there is no exposure of raw content data, thereby offering excellent protection of such content. Also, unauthorized access prevention can be strengthened by adding a copyguard signal to the video output signal.

Further features of the invention, its nature and various advantages will be more apparent from the accompanying drawings and following detailed description of the invention.

DESCRIPTION OF THE PREFERRED EMBODIMENT

Figure 1:
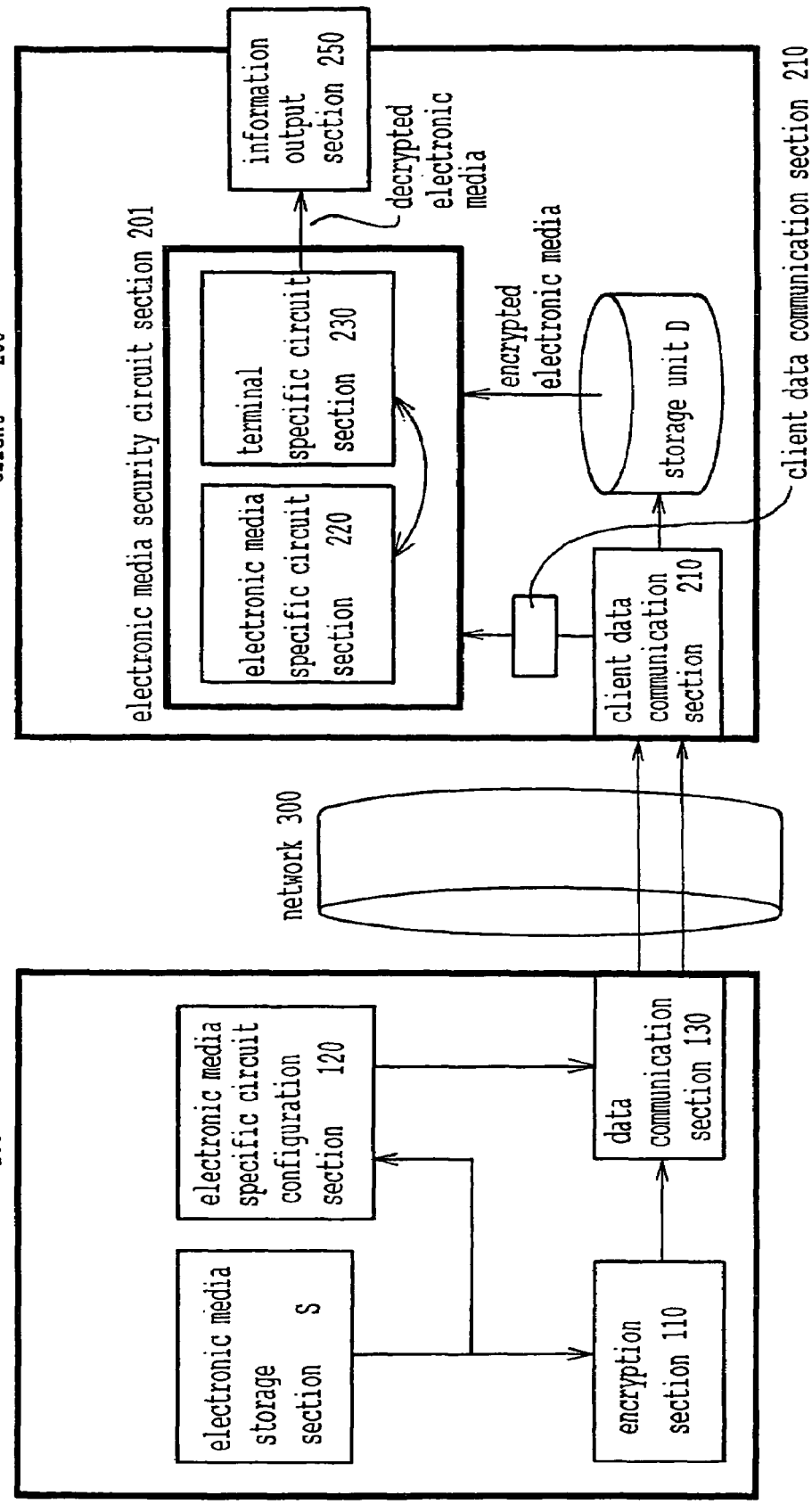
FIG. 1 is a block schematic diagram of the system of an electronic media communication apparatus according to a first example of the present invention.

Embodiments of the invention will now be described with reference to the drawings. FIG. 1 is a block schematic diagram of the system of an electronic media communication apparatus according to a first example of the present invention. The apparatus comprises a server 100 and a client 200 that are connected by a network 300.

First, the configuration of the server 100 will be described. The server 100 comprises an electronic media storage section S, an electronic media specific circuit configuration section 120, and a data communication section 130. The electronic media storage section S is used to store electronic media for delivery in response to a request from the client 200. The electronic media stored in the storage section S are digitized information such as still images, moving images, text, music and other such content. The encryption section 110 performs encryption of electronic media delivered to the client 200, using a cipher system uniquely implemented for the client 200. The electronic media specific circuit configuration section 120 generates the logic circuit data for decrypting the electronic media encrypted by the encryption section 110, removes from the generated logic circuit data the terminal specific circuit data uniquely implemented for the client 200 and generates the logic circuit data specific to the electronic media. The electronic media encrypted by the encryption section 110 and the logic circuit data generated by the circuit configuration section 120 are then sent to the client 200 by the data communication section 130.

Thus, when the client 200 requests delivery of electronic media, the server 100 individually encrypts the electronic media and delivers the encrypted electronic media to the client 200. An individual circuit, called an "electronic media specific circuit," is required for the decryption of each encrypted electronic media. The function of an electronic media specific circuit can be achieved by loading a logic programmable device such as a Complex Programmable Logic Device (CPLD) or Field Programmable Gate Array (FPGA) or the like with the data to configure the circuit, and by executing the data. Here, the data used to configure an electronic media specific circuit in a logic programmable device are called "electronic media specific circuit configuration data."

Next, the configuration of the client 200 will be described. The client 200 shown in FIG. 1 comprises a storage unit D, a client data communication section 210, an electronic media specific circuit section 220, a logic circuit configuration section 240, and an information output section 250. Encrypted electronic media and logic circuit data transmitted from the server 100 via the network 300 are received by the client data communication section 210. From the client data communication section 210, the encrypted electronic media are transferred to the storage unit D, where it is stored. The storage unit D may be constituted by a hard-disk device, an optical disk device or other such non-volatile storage, or by volatile memory such as RAM, or a combination thereof. The logic circuit data received are transferred from the client data communication section 210 to the terminal specific circuit section 230.

Based on the logic circuit data transferred from the client data communication section 210, the electronic media specific circuit section 220 generates an electronic media specific logic circuit. Then, the logic circuit configuration section 240 combines the logic circuit with the electronic media specific circuit section 220 uniquely implemented for the client 200, forming electronic media security circuit section 201. The original digital content can then be generated by inputting to the electronic media security circuit section 201 the encrypted electronic media stored in the storage unit D. Correct decryption is only possible when both the electronic media specific circuit section 220 and the terminal specific circuit section 230 are used together in combination.

The electronic media specific circuit section 220 and terminal specific circuit section 230 of the client 200 configuration shown in FIG. 1 may be implemented by using dedicated hardware, or by using the functions of logic programmable devices such as CPLDs or FPGAs. When logic programmable devices are used to configure the circuits 220 and 230, the circuits can be formed in the logic programmable devices by converting the circuit connection information (hereinafter called a "netlist") concerned with the circuits to electric signals of a prescribed format and inputting the same to the logic programmable devices.

The information output section 250 is used to convert the electronic media thus decrypted, as required, to a standard signal system format such as the National Television Standards Committee (NTSC), Digital Visual Interface (DVI), High Definition Multimedia Interface (HDMI) and the like, for an output as information that can be used as a text or for viewing.

Figure 2:
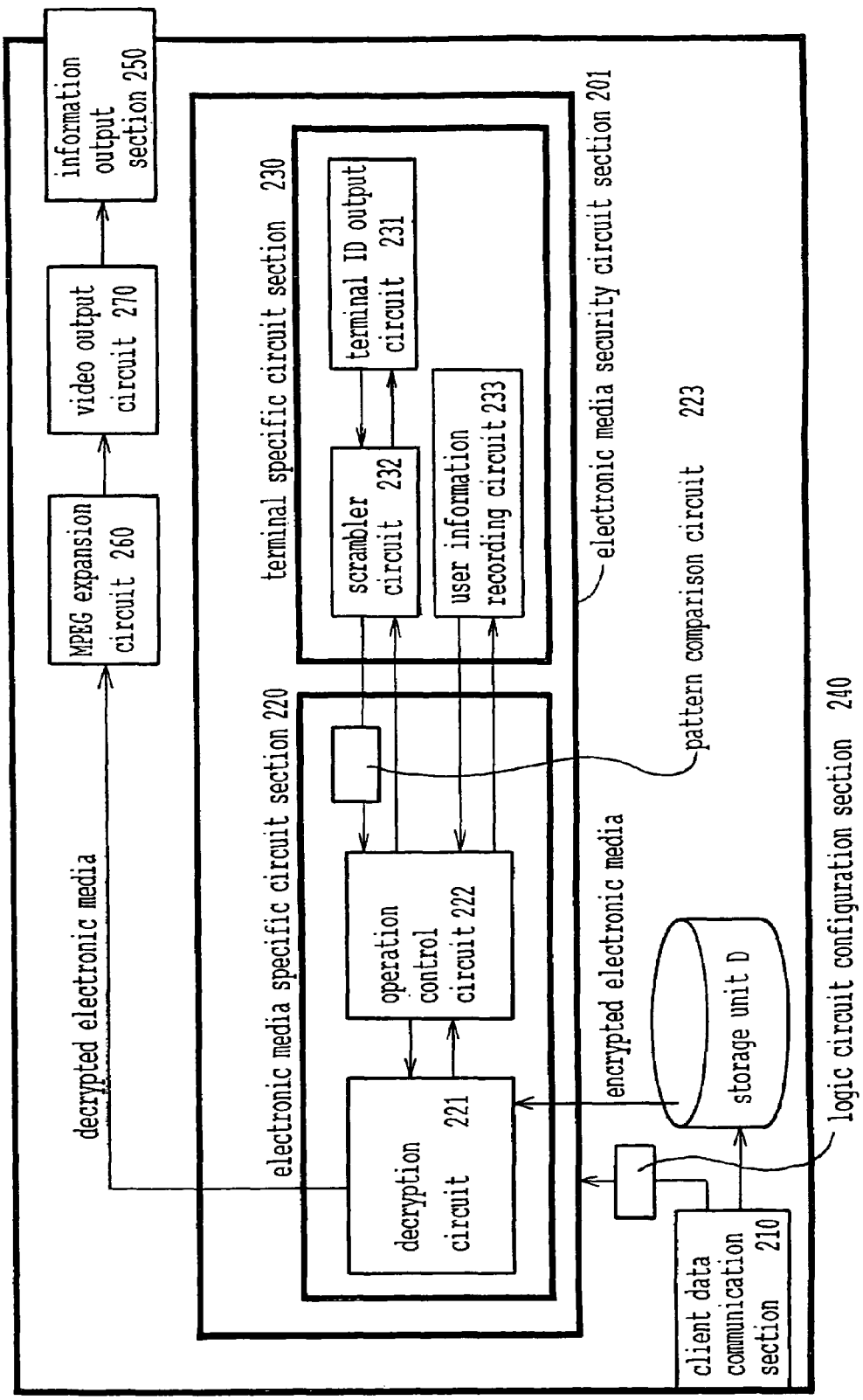
FIG. 2 is a block schematic diagram of a client 200 of the electronic media communication apparatus according to a second example of the invention.

FIG. 2 is a block schematic diagram of a client 200 of the electronic media communication apparatus according to a second example of the present invention. The client 200 shown in FIG. 2 comprises a storage unit D, a client data communication section 210, an electronic media specific circuit section 220, a terminal specific circuit section 230, a logic circuit configuration section 240, an information output section 250, an MPEG expansion circuit 260, and a video output circuit 270. The client data communication section 210 and storage unit D have the same functions as in the first example. The client 200 of this example is characterized by the provision of the MPEG expansion circuit 260 and video output circuit 270.

The electronic media communication apparatus of this second example comprises a server 100 (not shown) and the client 200, connected by a network 300 (not shown) The server 100 and network 300 have the same configuration and functions as those of the first example.

Based on logic circuit data transmitted from the client data communication section 210, the electronic media specific circuit section 220 generates decryption circuit 221 and operation control circuit 222 that constitute the circuit 220. The decryption circuit 221 has the function of decrypting the encrypted electronic media to regenerate the original digital content. The operation control circuit 222 has the function of controlling the operation of the decryption circuit 221 so that the decryption circuit 221 operates only when the decryption circuit 221 and terminal specific circuit section 230 are correctly combined and there is a valid right to replay the electronic media.

The decryption circuit 221, operation control circuit 222 and pattern comparison circuit 223 can be configured in the logic programmable device by making up a composite netlist of the above-mentioned three circuits, converting the netlist to electric signals of a prescribed format and inputting the same netlist to the logic programmable device. A conventional apparatus and program can be used to configure the circuits 221, 222 and 223, based on the netlist connection data.

The terminal specific circuit section 230 has a terminal ID output circuit 231 that outputs the terminal ID of a terminal (not shown) connected to the client, a scrambler circuit 232 that uses electronic media specific information to scramble the terminal ID, and a user information recording circuit 233 that checks the plays remaining counter in cases where there is a limit on the number of times the electronic media can be replayed. The scrambler circuit 232 uses information specific to the electronic media and the terminal ID to randomly generate a unique terminal ID without external exposure of the original terminal ID. Specifically, this is done by, firstly, the terminal ID output circuit 231 outputting a 256-bit binary number constituting a terminal ID specific to the terminal. Then, the scrambler circuit 232 takes the exclusive logical sum of the terminal ID and the hash value of the electronic media to provide a seed value represented as a 256-bit binary number, and generates pseudorandom numbers 256 times, and the final value of the pseudorandom (256-bit binary) number thus obtained is output as a scrambled terminal ID.

The electronic media security circuit section 201 in the electronic media communication apparatus of this second example is constituted by combining the electronic media specific circuit section 220 and the terminal specific circuit section 230. It is checked whether both the first condition of the correct combination of the circuit sections 220 and 230 and the second condition of a valid right to replay the electronic media are satisfied. The circuit 201 will only operate when both conditions are met.

When the circuit section 221 and circuit 222 are implemented as configurations within a logic programmable device, the electronic media security circuit section 201 does so after judging the above two conditions, as follows.

Judgment of first condition: The operation control circuit 222 within the electronic media specific circuit section 220 inputs the hash value of the encrypted electronic media to the scrambler circuit 232. Then, a value output by the scrambler circuit 232 is input to the pattern comparison circuit 223 in the electronic media specific circuit section 220. If at this time the input from the operation control circuit 222 to the scrambler circuit 232 and the output from the scrambler circuit 232 function normally and the 256 bits output from the pattern comparison circuit 223 are all 1's, the circuit section 220 and circuit 232 are judged to be correctly combined. Even when the input from the operation control circuit 222 to the scrambler circuit 232 and the output from the scrambler circuit 232 function normally, the operation control circuit 222 will still stop electrically the operation of the electronic media specific circuit section 220 or disable the section 220 if the 256 bits output from the pattern comparison circuit 223 are not all 1's.

Judgment of second condition: The operation control circuit 222 also checks whether or not there are limitations on the number of times or period or the like the electronic media can be played. If no such limitation is detected, it is judged that there is a valid right to play the media. If a limitation on media playback is detected, for example, a limitation on the playback period, the operation control circuit 222 reads the timer of the client 200 to check whether or not the current time is within the playback period. If the current time is not within the playback period, the right to replay the electronic media is judged to be invalid and the operation control circuit 222 stops the operation of the electronic media specific circuit section 220 or electrically disables the section 220.

When there is a limitation on the number of times the electronic media can be played, the operation control circuit 222 outputs the encrypted electronic media hash value and the number of replays allowed to the user information recording circuit 233 in the terminal specific circuit section 230. The user information recording circuit 233 checks the plays remaining counter corresponding to the media hash value, and if the counter has not yet been initialized, initializes the counter to the replay limitation number. If the plays remaining counter is above zero, the user information recording circuit 233 decrements the counter by one and sends the operation control circuit 222 a notification that electronic media replay is normal. If the counter is at zero, the user information recording circuit 233 sends an error notification to the operation control circuit 222, which stops the operation of the electronic media specific circuit section 220 or electrically disables the section 220.

When the first and second conditions are both satisfied, the electronic media security circuit section 201 within the logic programmable device operates normally and the original digital content is generated by decrypting the encrypted electronic media. Thus, the client 200 of this second example has a configuration that records the number of times the electronic media are replayed or copied, making it possible to prevent the media being replayed or copied more than a specified number of times.

Figure 3:
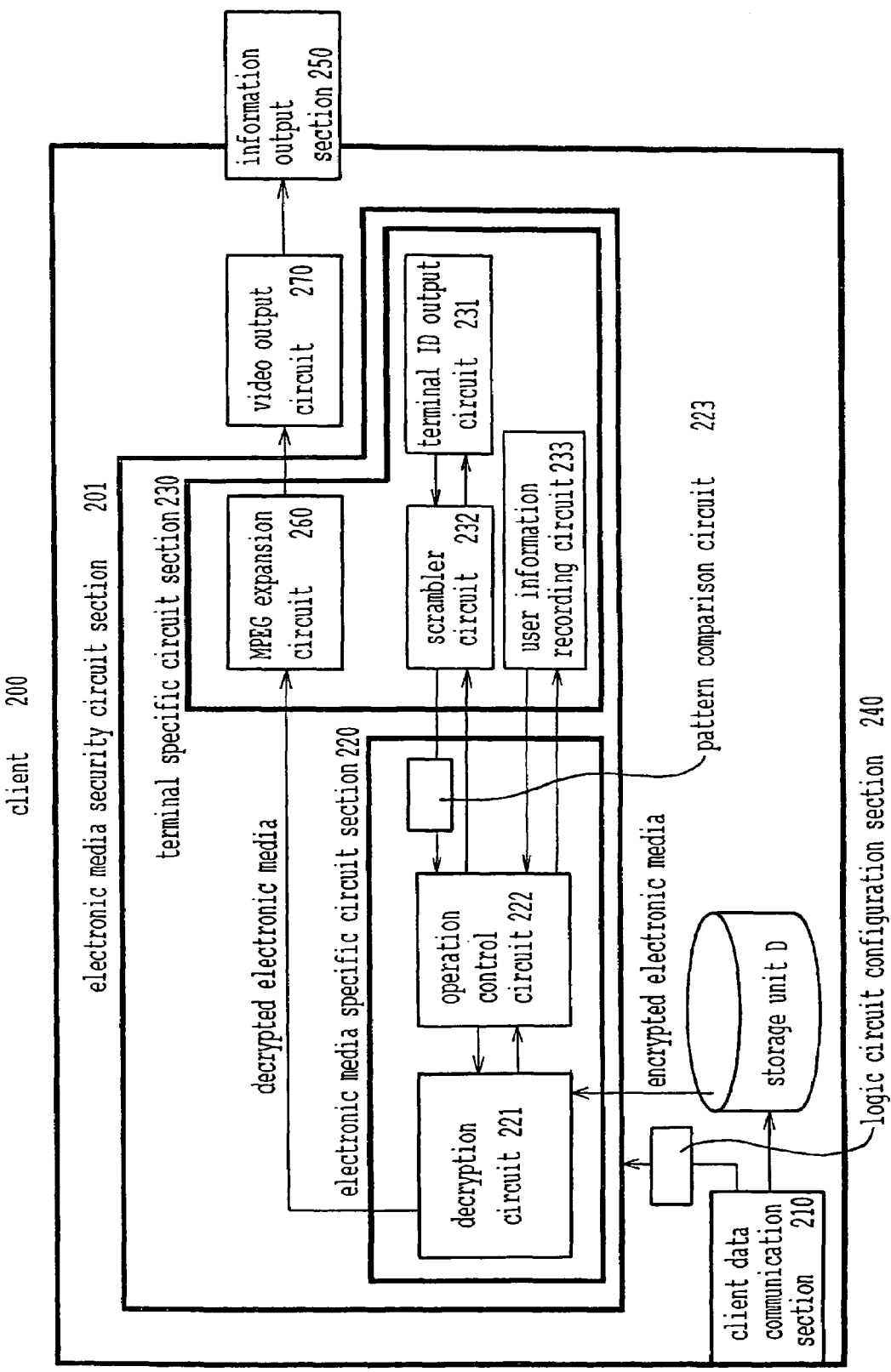
FIG. 3 is a block schematic diagram of a client 200 of the electronic media communication apparatus according to a third example of the invention.

FIG. 3 is a block schematic diagram of the configuration of the client 200 of an electronic media communication apparatus according to a third example of the present invention. The client 200 shown in FIG. 3 comprises a storage unit D, a client data communication section 210, an electronic media specific circuit section 220, a terminal specific circuit section 230, logic circuit configuration section 240, an information output section 250, an MPEG expansion circuit 260 and a video output circuit 270. Parts that are the same as those of the second example are denoted by the same reference symbols, and further explanation thereof is omitted. In this third example, the MPEG expansion circuit 260 is configured as part of the terminal specific circuit section 230. Thus, when encrypted electronic media are of moving-picture data that have been compressed using a format conforming to the MPEG standard such as MPEG-1 or MPEG-2 or the like are decoded and expanded to a usable form, the client 200 prevents the decoded media being output outside the logic programmable device.

Figure 4:
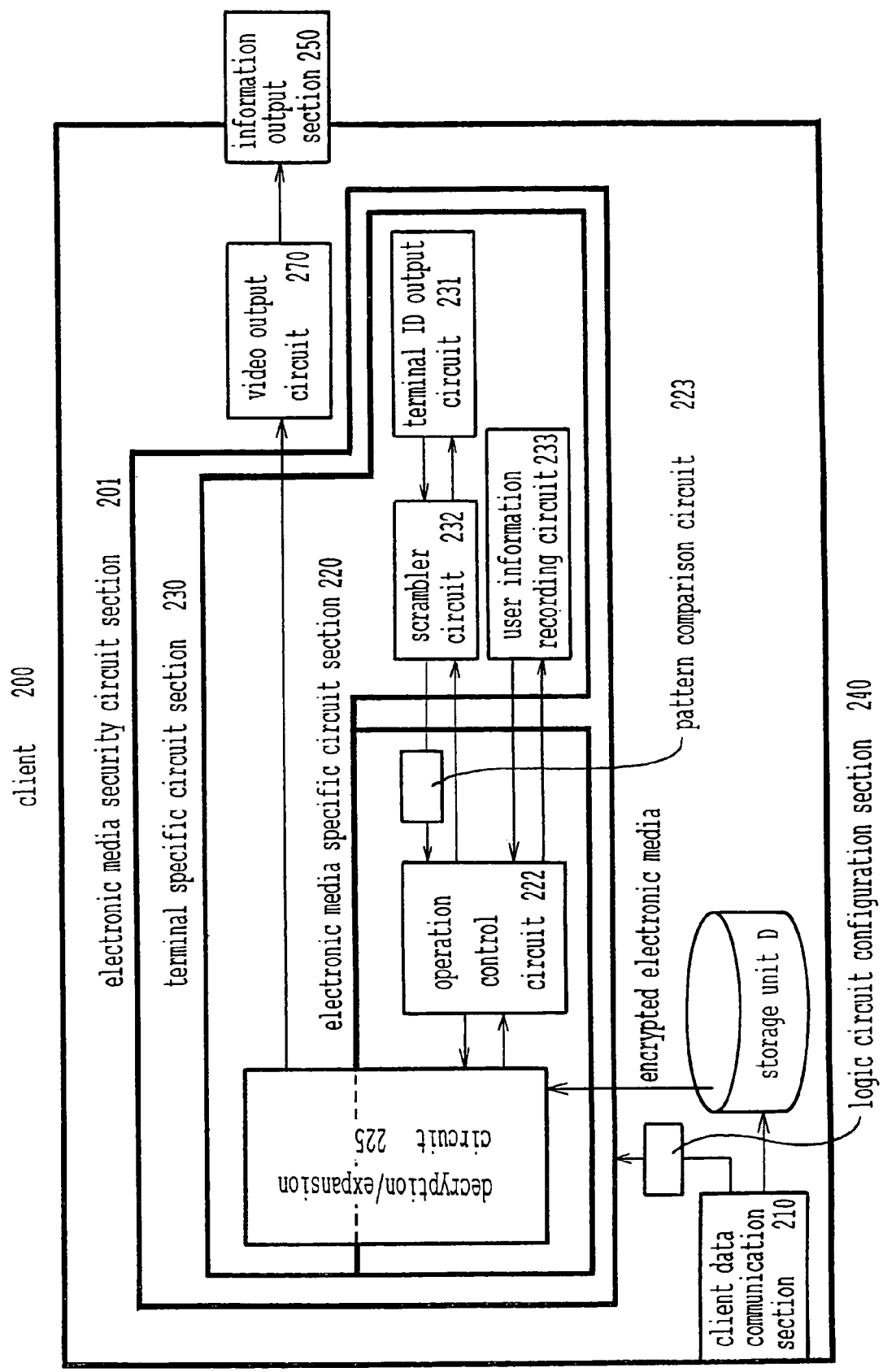
FIG. 4 is a block schematic diagram of a client 200 of the electronic media communication apparatus according to a fourth example of the invention.

FIG. 4 is a block schematic diagram of the configuration of the client 200 of an electronic media communication apparatus according to a fourth example of the invention. Parts that are the same as those of the second example are denoted by the same reference symbols, and further explanation thereof is omitted.

In the client 200 shown in FIG. 4, the decryption circuit 221 and the MPEG expansion circuit 260 are integrated into one circuit, which is decryption/expansion circuit 225. Operation control circuit 222 and pattern comparison circuit 223 are generated on the basis of logic circuit data received from the client data communication section 210. The decryption/expansion circuit 225 can be formed in the logic programmable device by converting the netlist thereof to electric signals of a prescribed format and inputting the same to the logic programmable device.

Part of the decryption/expansion circuit 225 is configured in the electronic media specific circuit section 220, and the remaining elements are configured in the terminal specific circuit section 230. Thus, in accordance with this fourth example, it is more difficult to infer the terminal specific circuit section 230, and decrypting of the electronic media and decoding the moving-picture data MPEG-encoded can be done on an integrated basis, providing more efficient decoding and expansion of the encrypted electronic media.

Figure 5:
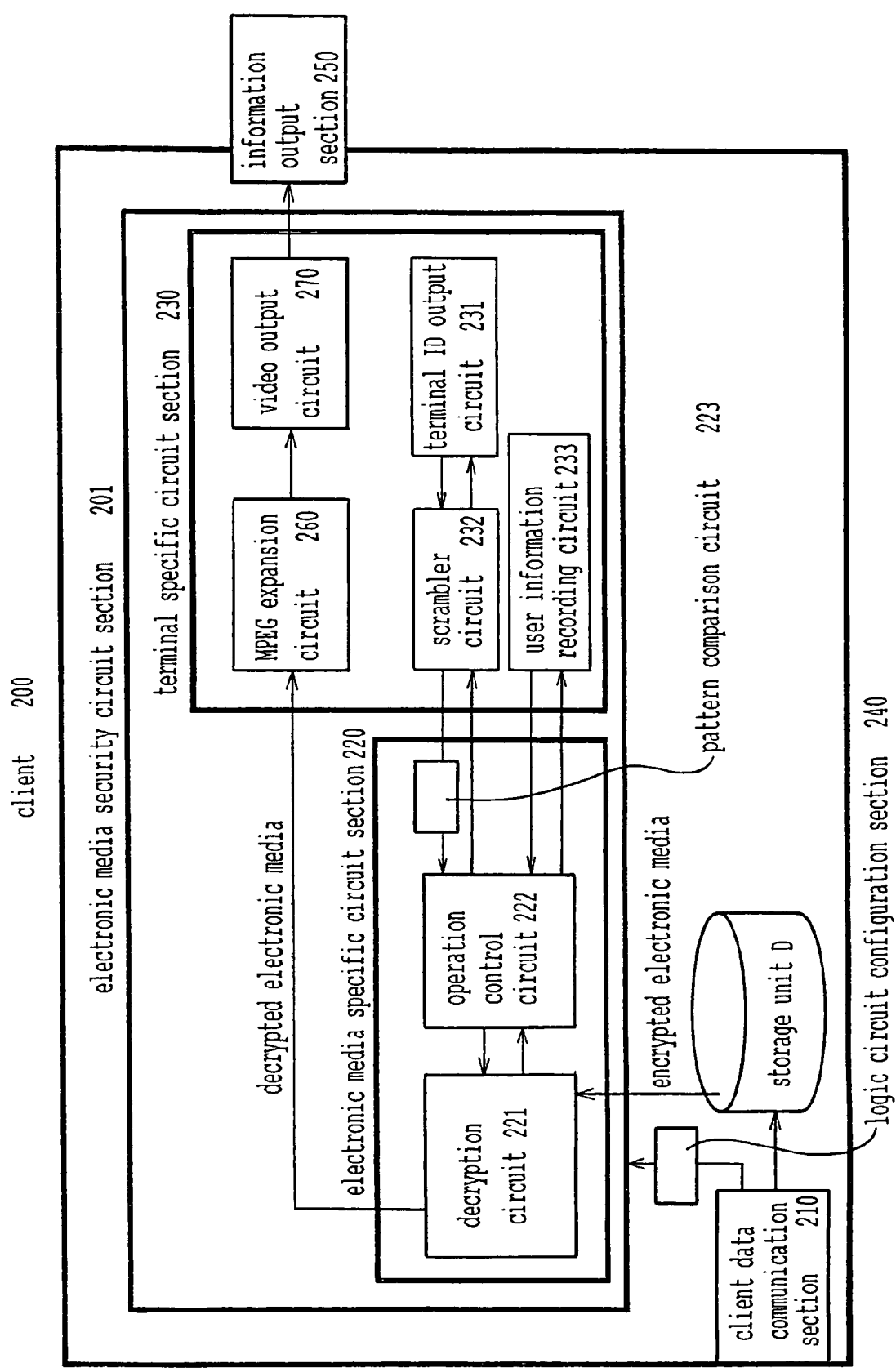
FIG. 5 is a block schematic diagram of a client 200 of the electronic media communication apparatus according to a fifth example of the invention.

FIG. 5 is a block schematic diagram of the configuration of the client 200 of an electronic media communication apparatus according to a fifth example. Parts that are the same as those of the second example are denoted by the same reference symbols, and further explanation thereof is omitted.

In the case of the client 200 shown in FIG. 5, the MPEG expansion circuit 260 and the video output circuit 270 are each formed as part of the terminal specific circuit section 230. That means that in accordance with the client 200 of this fifth example, in addition to the decoding and expansion processing of the encrypted electronic media, conversion of the usable digital data of the electronic media to signals for an output to an external output device can also be performed in an enclosed state inside the logic programmable device.

In the client 200 configuration shown in FIG. 5, the MPEG expansion circuit 260 and video output circuit 270 are generated as part of the terminal specific circuit section 230, based on logic circuit data received from the client data communication section 210. The circuits 260 and 270 can be configured in the logic programmable device by converting the netlists thereof to electric signals of a prescribed format and inputting the same to the logic programmable device. In the case of the fifth example, as described above, the usable digital data of the electronic media is not externally output; only a video signal is output externally. This strengthens the protection of the content.

Figure 6:
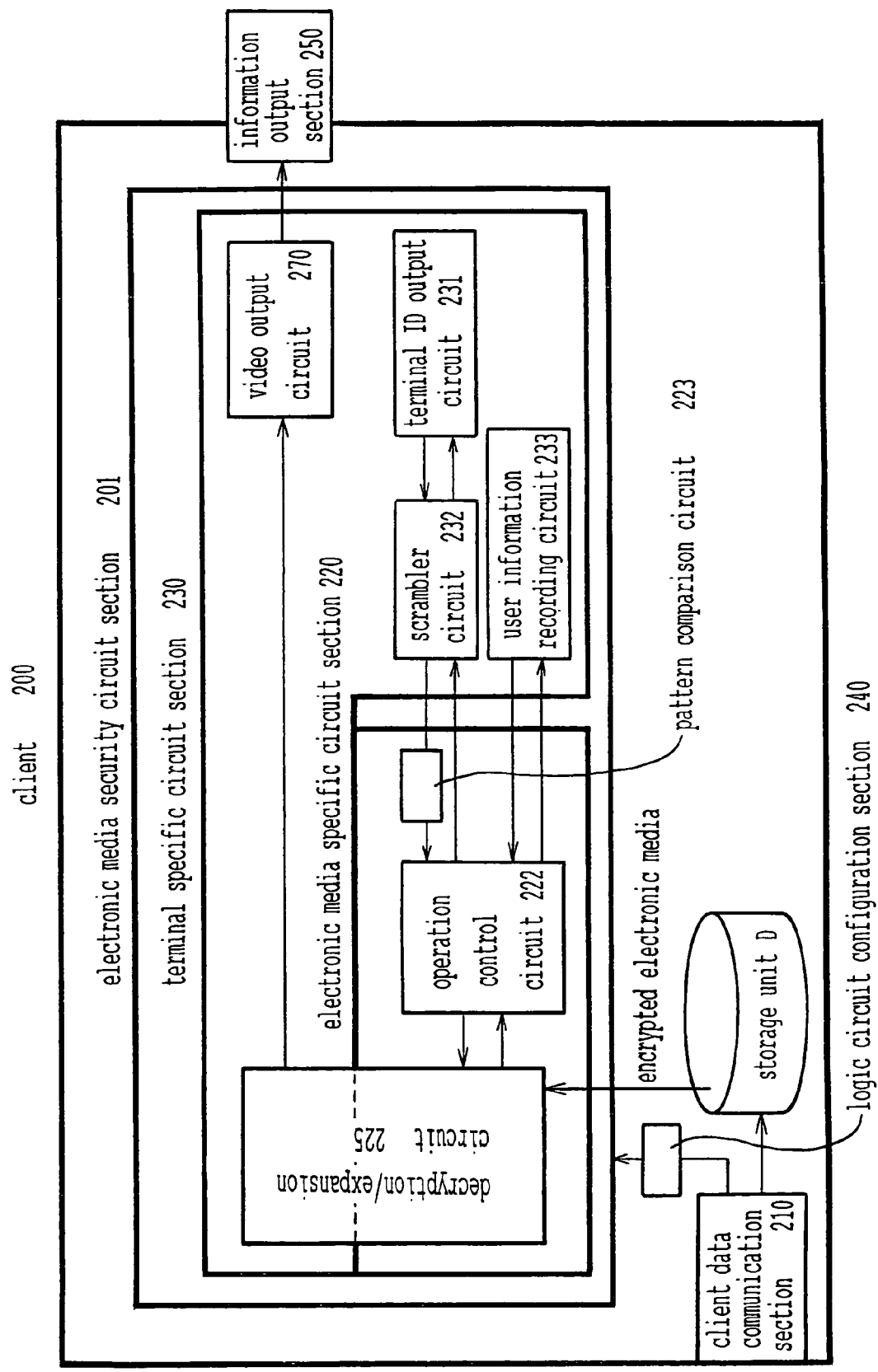
FIG. 6 is a block schematic diagram of a client 200 of the electronic media communication apparatus according to a sixth example of the invention.

FIG. 6 is a block schematic diagram of the configuration of the client 200 of a sixth example of the electronic media communication apparatus. Here too, parts that are the same as those of the second example are denoted by the same reference symbols, and further explanation thereof is omitted.

In the client 200 configured as shown in FIG. 6, the decryption circuit 221 and the MPEG expansion circuit 260 are integrally constituted as a single circuit, which is the decryption/expansion circuit 225, and the video output circuit 270 is configured as part of the terminal specific circuit section 230. The circuits 225 and 270 are generated on the basis of logic circuit data received from the client data communication section 210. Specifically, the circuits 225 and 270 can be formed in a logic programmable device by converting the netlists thereof to electric signals of a prescribed format and inputting the same to the logic programmable device.

Part of the decryption/expansion circuit 225 is configured in the electronic media specific circuit section 220, and the remaining elements are configured in the terminal specific circuit section 230, together with the video output circuit 270. Thus, as in the case of the fourth example, this sixth example makes it more difficult to infer the terminal specific circuit section 230, and decrypting of the electronic media and decoding the moving-picture data MPEG-encoded can be done on an integrated basis. In addition, as in the case of the fifth example, only a video signal is output externally, not the electronic media in its usable digital data form. Therefore, this strengthens the protection of the content.

Figure 7:
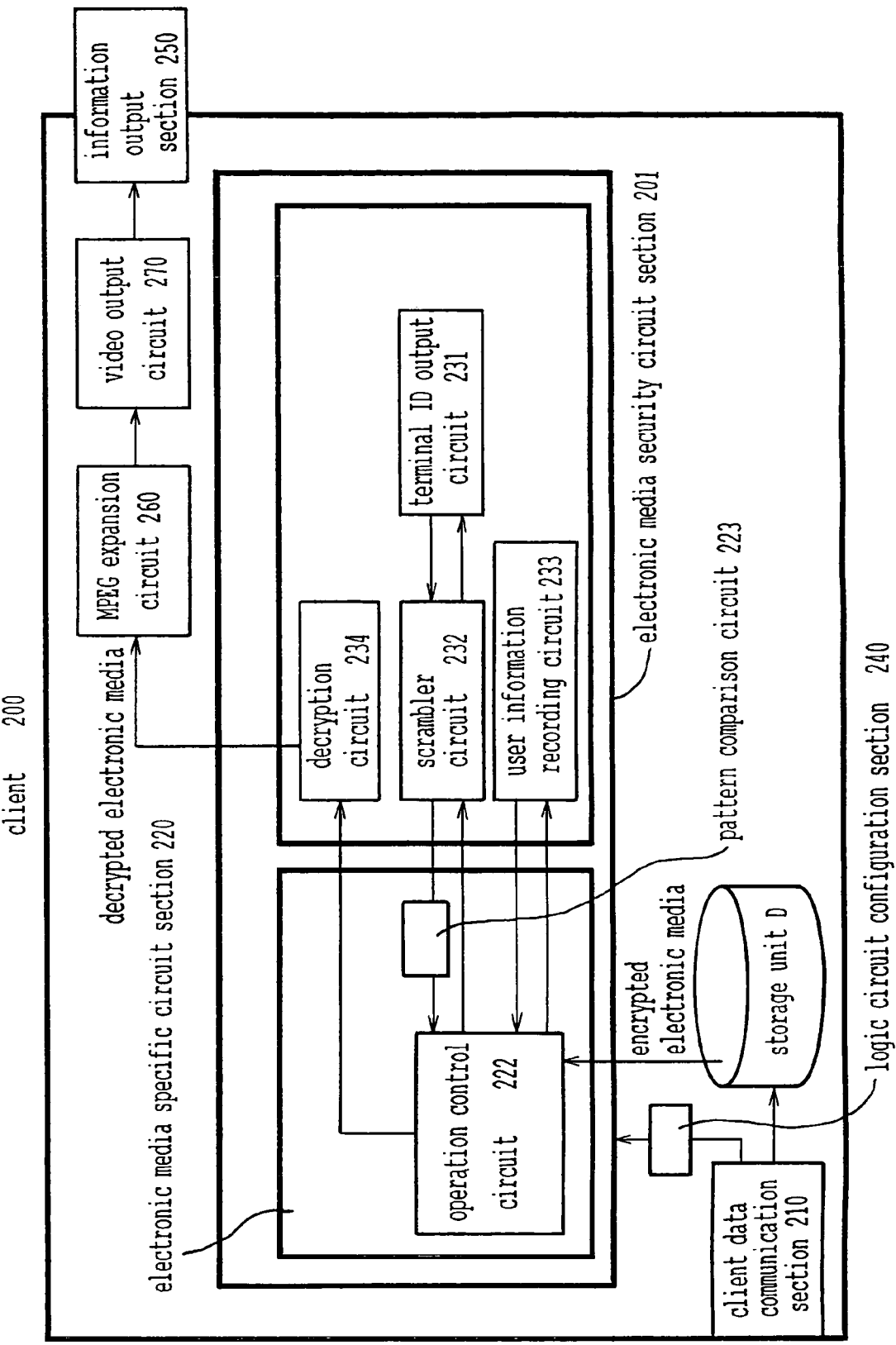
FIG. 7 is a block schematic diagram of a client 200 of the electronic media communication apparatus according to a seventh example of the invention.
Figure 8:
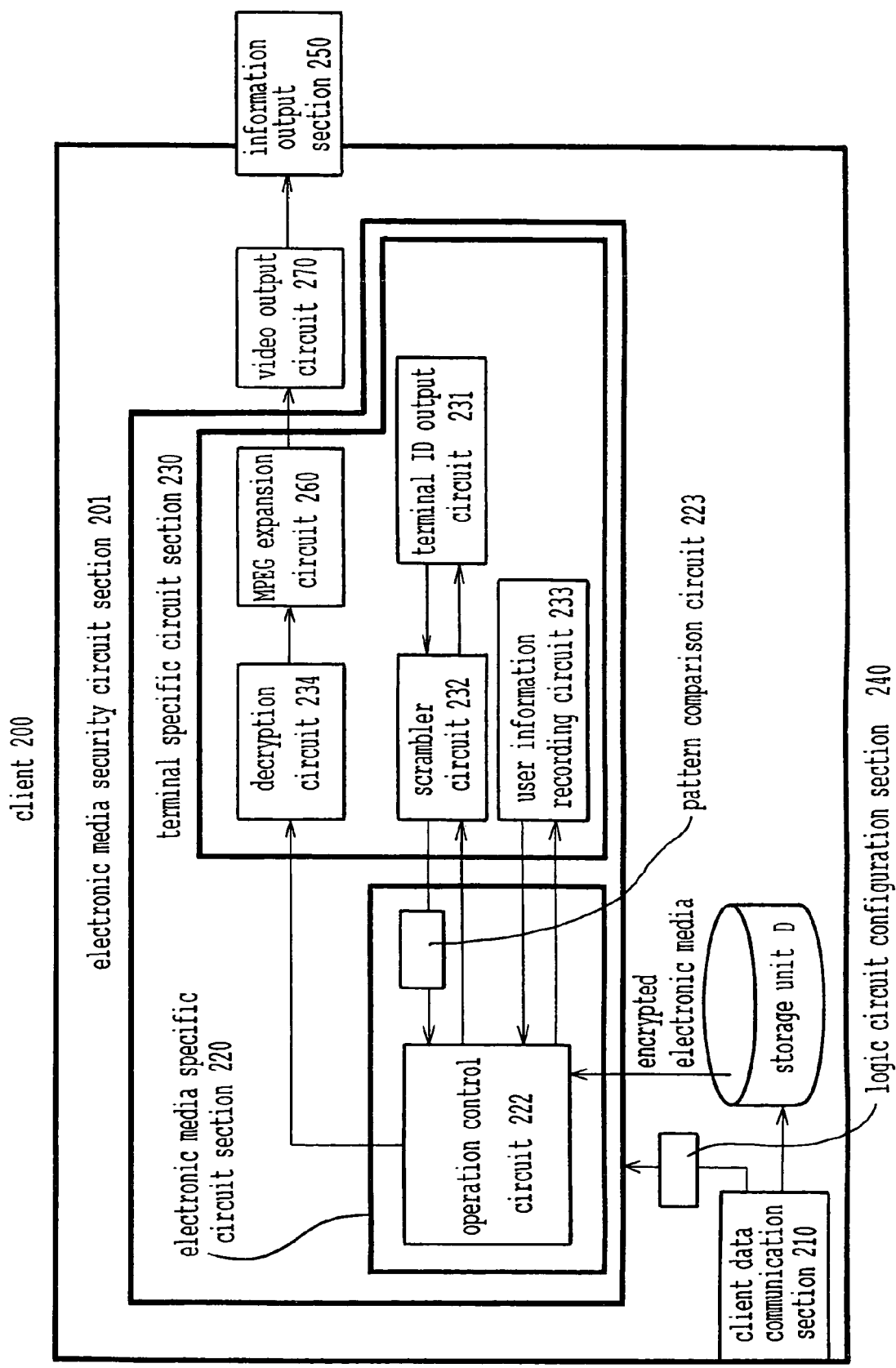
FIG. 8 is a block schematic diagram of a client 200 of the electronic media communication apparatus according to an eighth example of the invention.
Figure 9:
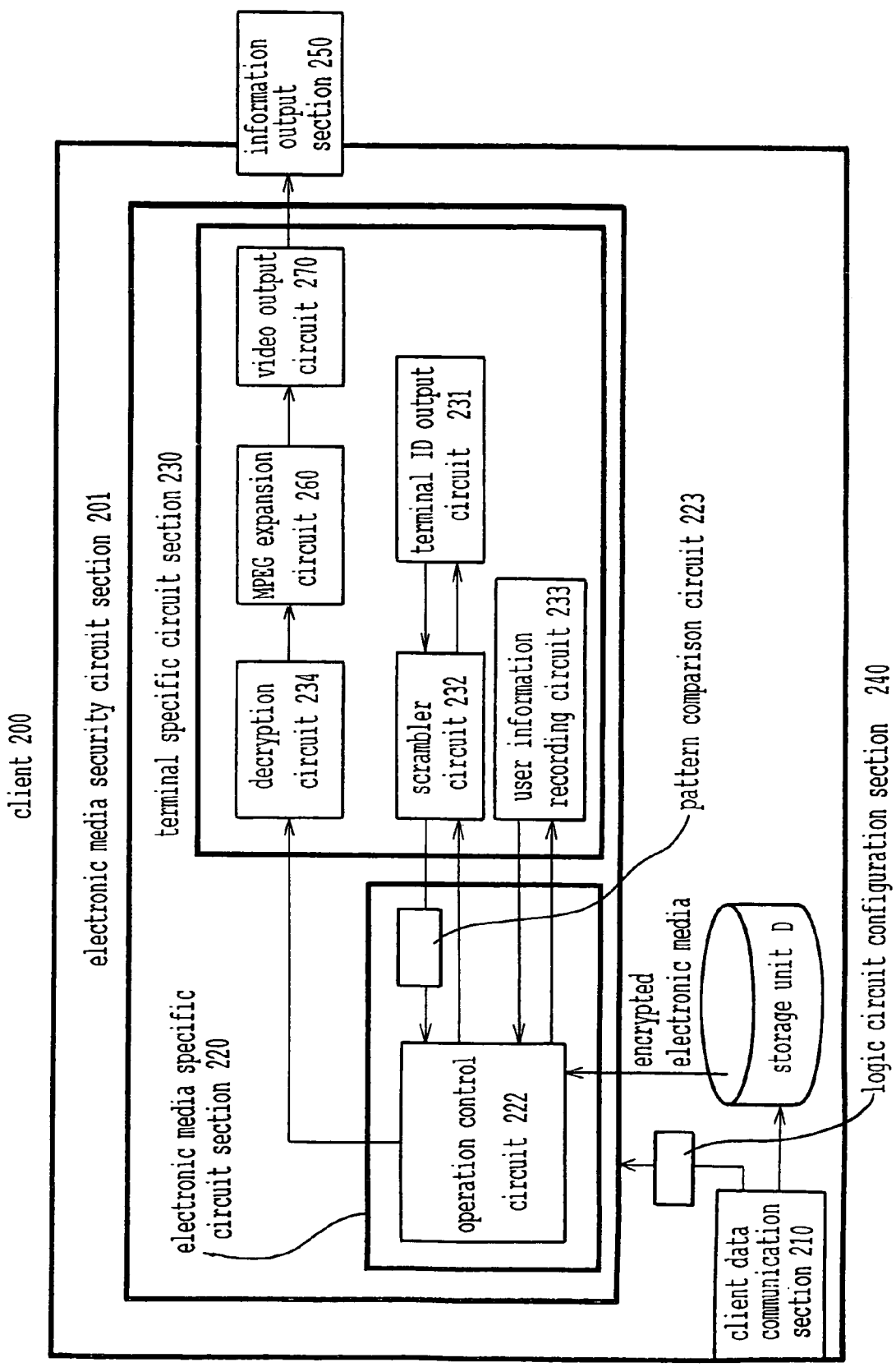
FIG. 9 is a block schematic diagram of a client 200 of the electronic media communication apparatus according to a ninth example of the invention.

FIGS. 7 to 9 are block schematic diagrams of the client 200 according to seventh to ninth examples, respectively. In each of these examples, the operation control circuit 222 and pattern comparison circuit 223 are configured within the electronic media specific circuit section 220, and the terminal ID output circuit 231, the scrambler circuit 232, and a decryption circuit 234 are provided within the terminal specific circuit section 230. Also, the constitutions and functions of the clients 200 of the seventh to ninth examples are uniquely implemented for those of the clients 200 of the second, third and fifth examples, respectively. Parts that are the same as those of the second example are denoted by the same reference symbols, and further explanation thereof is omitted.

The decryption circuit 234, which is an electronic media specific logic circuit, is generated in the terminal specific circuit section 230 based on logic circuit data received from the client data communication section 210. Under the control of the operation control circuit 222, the decryption circuit 234 in the section 230 is only operated when the decryption circuit 234 and terminal specific circuit section 230 are correctly combined.

In the case of the seventh to ninth examples, similarly to the second example, the logic circuit data are the data from which terminal specific circuit data uniquely implemented for the client 200 has been removed, and a composite netlist is used to constitute the circuits 222 and 223. The logic circuit configuration section 240 combines the above-mentioned netlist with the netlist of the terminal specific circuit section 230 uniquely implemented for the client 200, converts the netlist thus obtained to electric signals of a prescribed format and inputs the same to the logic programmable device, to thereby configure the electronic media security circuit section 201 in the logic programmable device. A conventional apparatus and program can be used to configure the circuits 222 and 223, based on the netlist connection data.

As in the case of the second example, the electronic media security circuit section 201 in the electronic media communication apparatus of the seventh to ninth examples, is constituted by combining the electronic media specific circuit section 220 and the terminal specific circuit section 230; neither section can enable correct function correctly on its own. Using the same method of judging the first and second conditions described with respect to the second example, a check is conducted as to whether or not the condition that the sections 220 and 230 be correctly combined is satisfied, and if at least that condition is satisfied, the electronic media security circuit section 201 is configured. Thus, when the first and second conditions are satisfied, encrypted electronic media can be correctly decrypted by the electronic media security circuit section 201 formed in the logic programmable device, enabling the original digital content to be generated.

What is claimed is:

1. An electronic media communication apparatus that distributes encrypted electronic media from a server to a client over a network, the server comprising:
  encryption means that performs encryption of electronic media distributed to the client, using an encryption system according to mechanisms in the client:
  electronic media specific circuit configuration means that generates logic circuit data for decrypting the encrypted electronic media and removes from the generated logic circuit data a circuit data specific to a terminal uniquely implemented for the client to generate logic circuit data specific to the electronic media; and
  means for transmitting to the client the encrypted electronic media and the logic circuit data generated by the electronic media specific circuit configuration means;

the client comprising:
  means for configuring an electronic media security circuit by receiving the logic circuit data generated by the electronic media specific circuit configuration means, generating a logic circuit specific to the electronic media and combining the logic circuit and a terminal specific circuit uniquely implemented for the client; and
  information output means that uses the electronic media security circuit to decrypt the encrypted electronic media and converts it to usable electronic media for an output, wherein the client operates correctly only when the electronic media specific circuit and the terminal specific circuit are correctly combined.

2. The apparatus according to claim 1, further comprising an operation control circuit having a function of operating the electronic media security circuit only when a condition that the electronic media specific circuit and the terminal specific circuit be correctly combined, and a condition that there be a valid right to replay the electronic media, are satisfied.

3. The apparatus according to claim 1, wherein the terminal specific circuit is provided with a terminal ID output circuit having a function of outputting an ID of a terminal connected to the client, and a scrambler circuit having a function of scrambling the terminal ID by using electronic media specific information without externally exposing the terminal ID.

4. The apparatus according to claim 1, wherein, in the client, based on the logic circuit data generated by the electronic media specific circuit configuration means, part of a decryption/expansion circuit that integrates an expansion circuit that restores compressed data and a decryption circuit is configured in an electronic media specific logic circuit, and remaining configuration elements are configured in the terminal specific circuit.

* * * * *